United States Patent Office
3,297,173
Patented Jan. 10, 1967

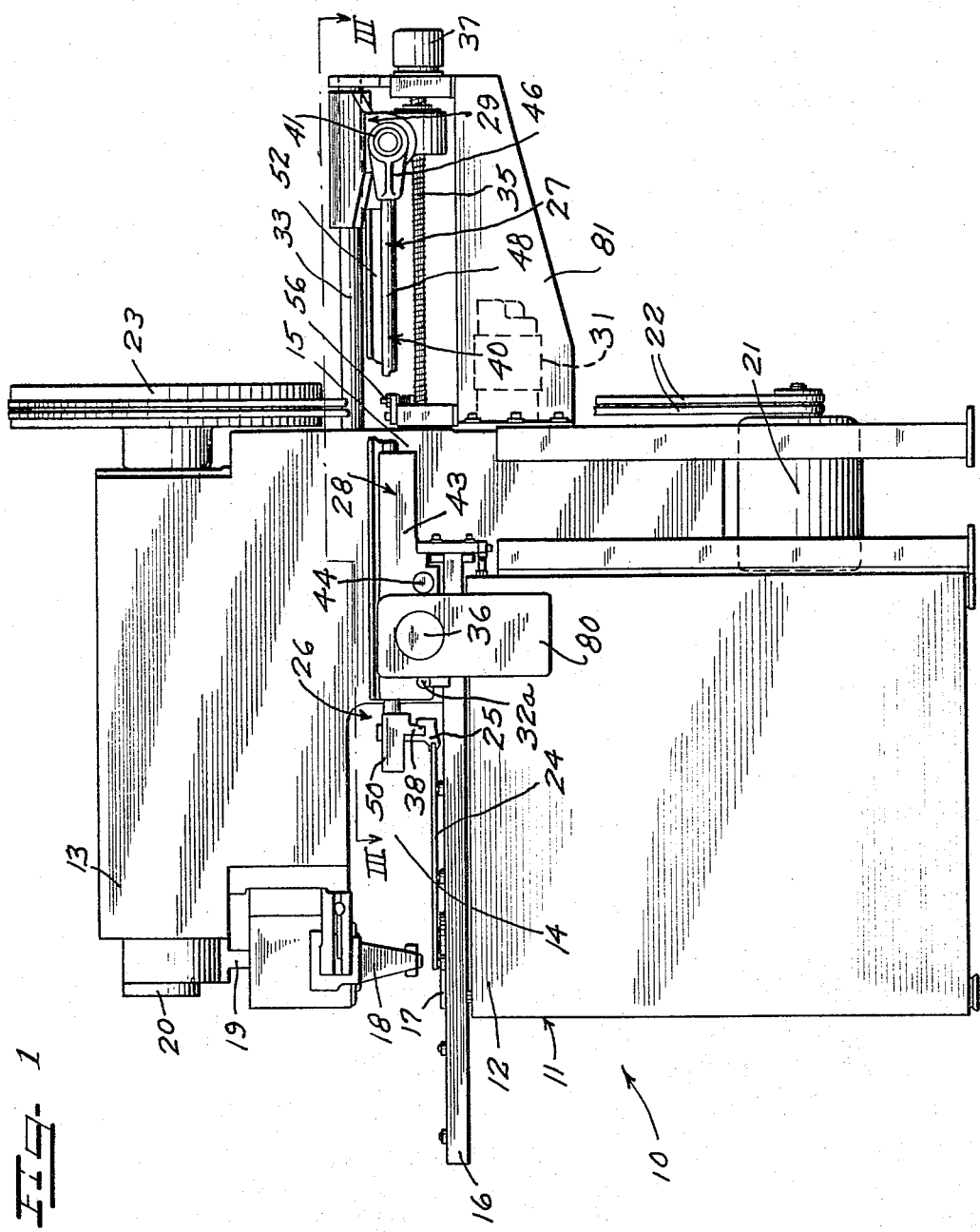

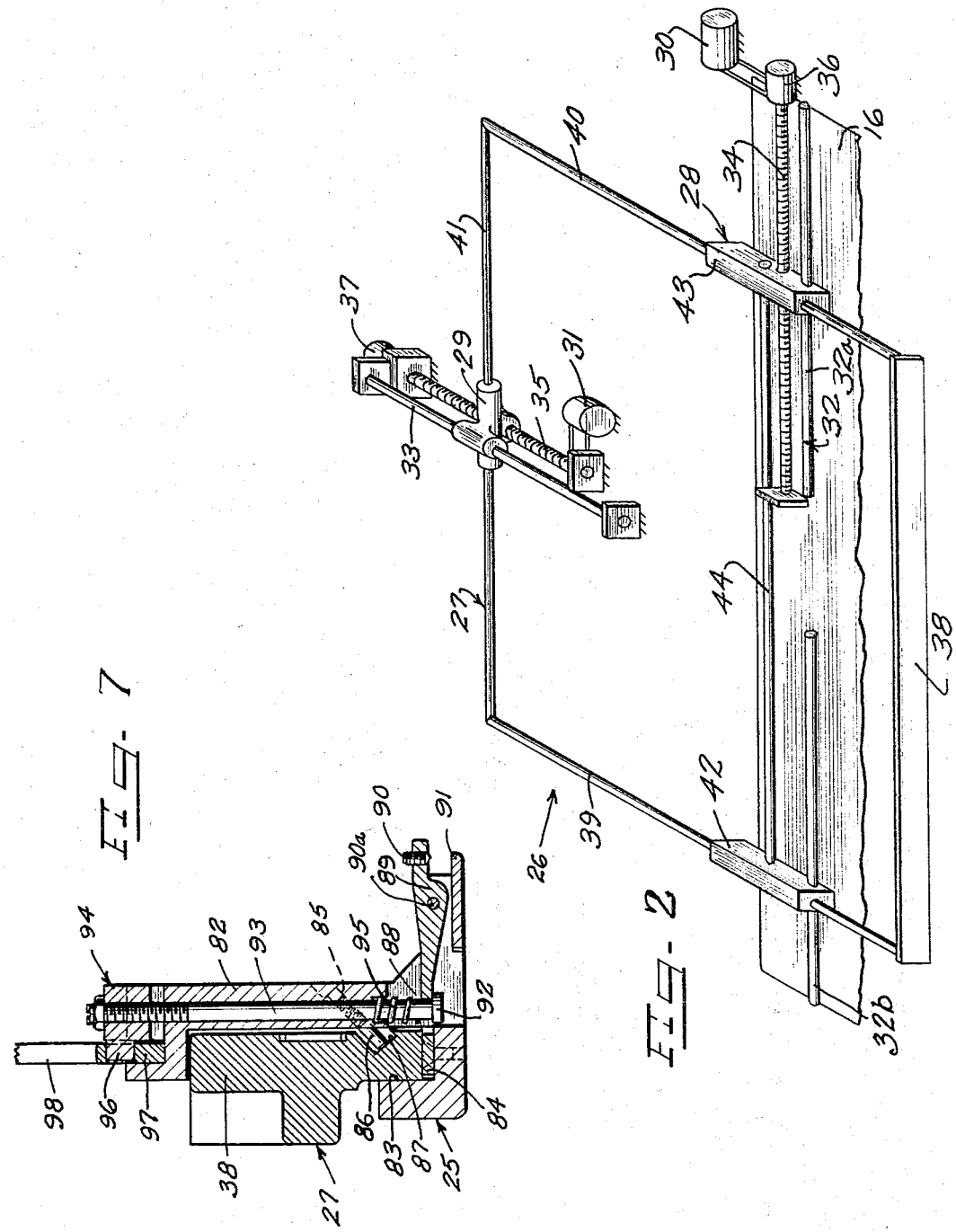

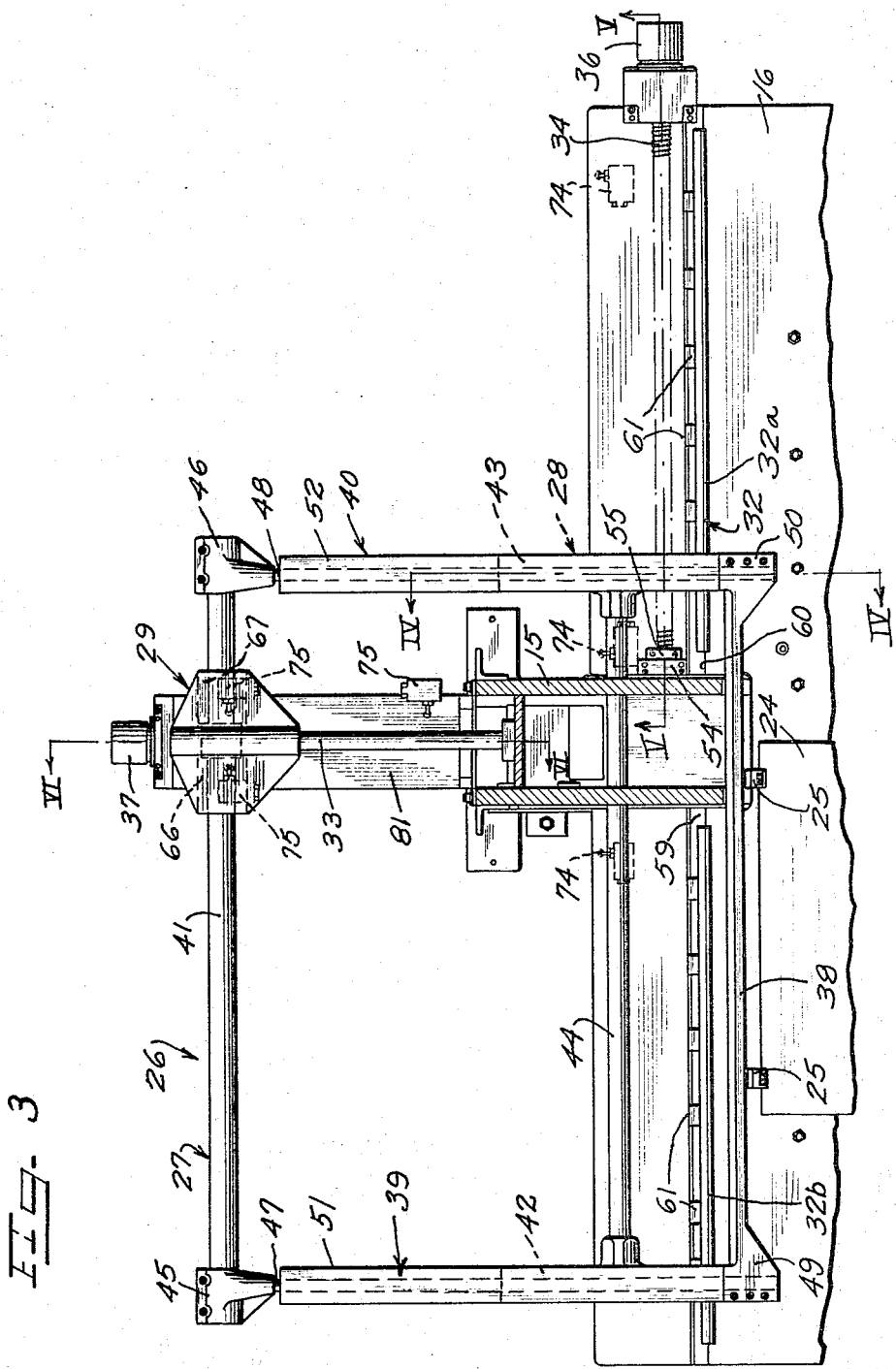

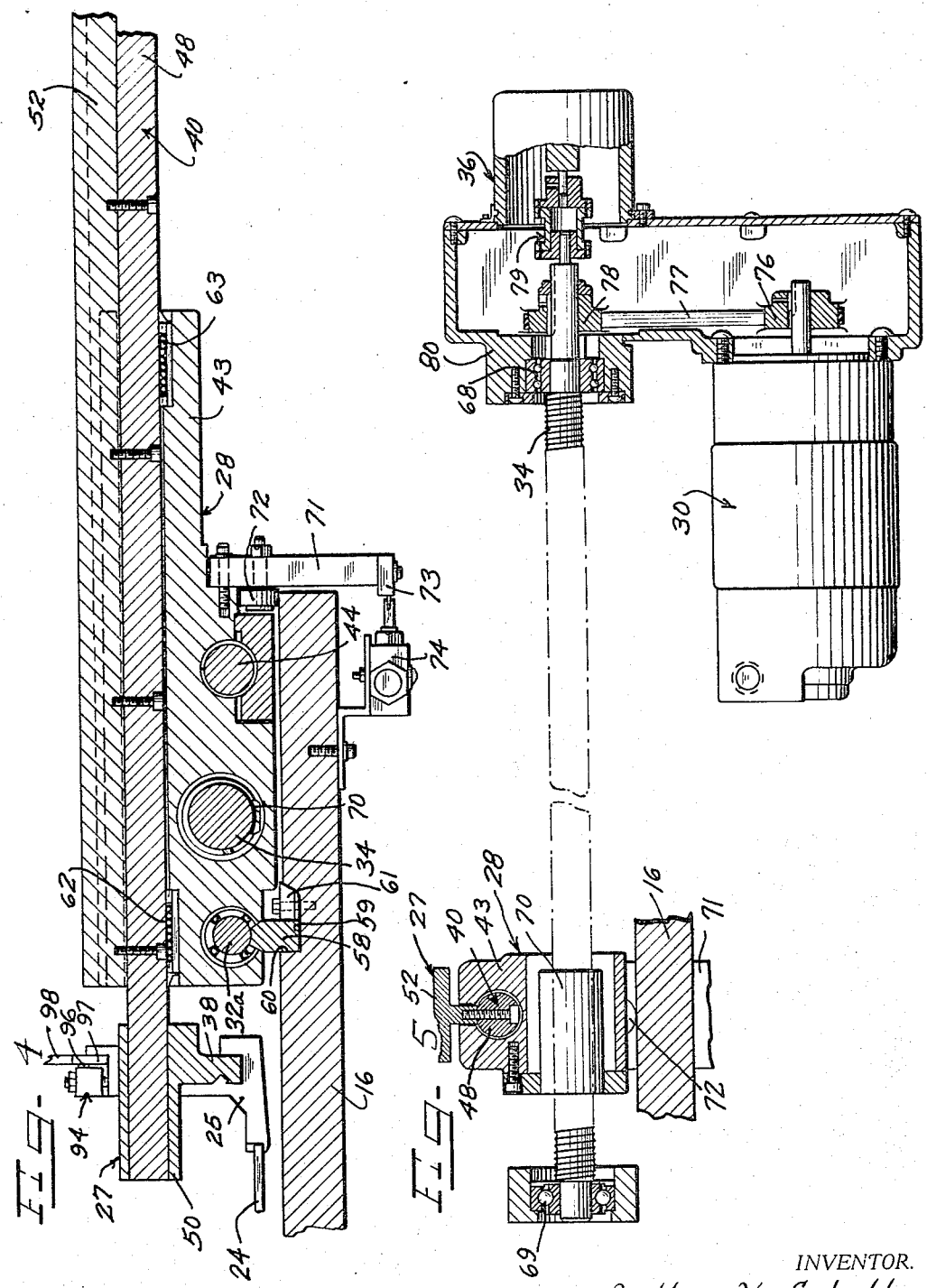

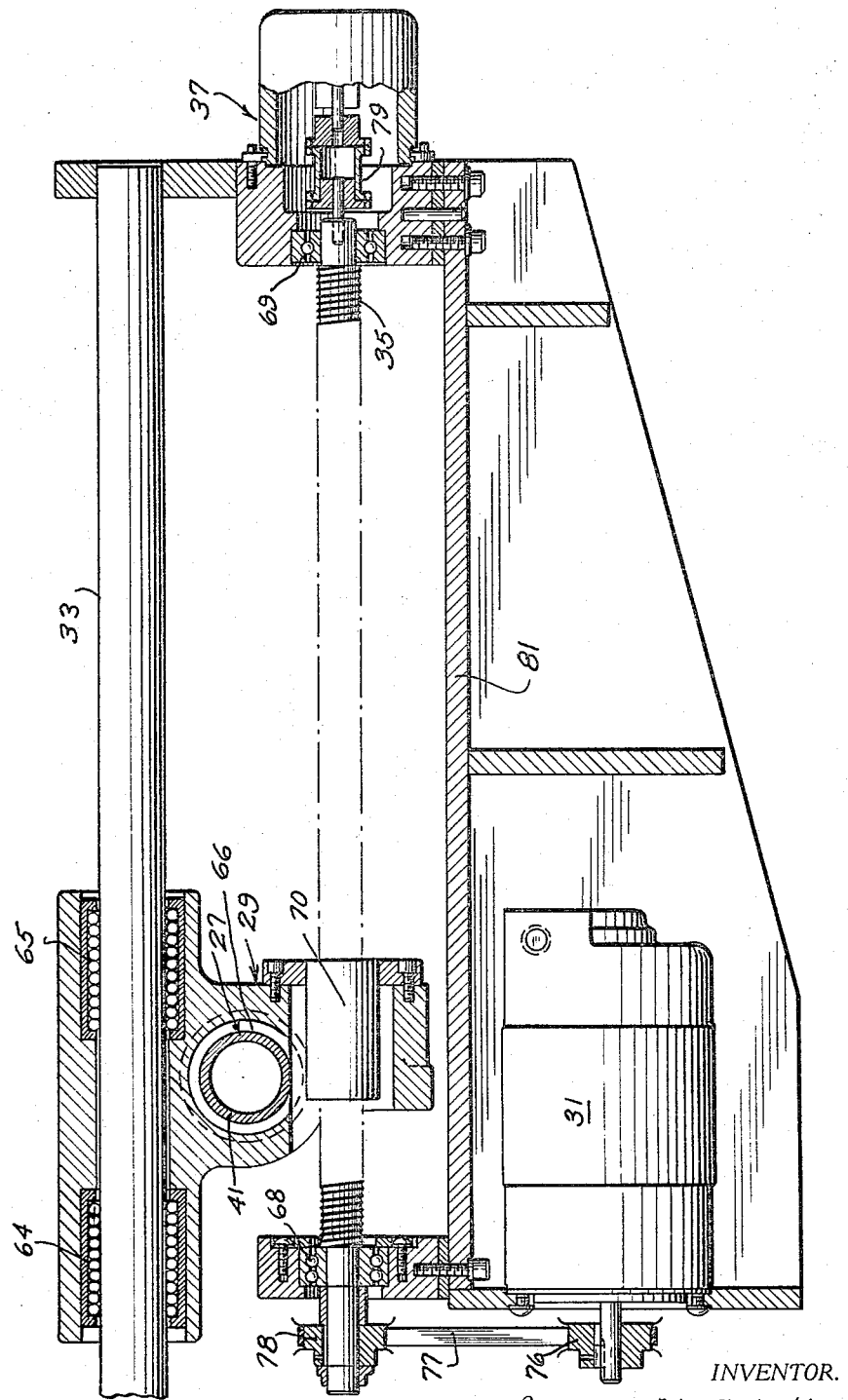

3,297,173
WORKPIECE POSITIONING MECHANISM
FOR A MACHINE TOOL
Arthur K. Schott, Clarence, N.Y., assignor to Houdaille Industries, Inc., Buffalo, N.Y., a corporation of Michigan
Filed Oct. 9, 1964, Ser. No. 402,864
11 Claims. (Cl. 214—1.3)

This invention relates generally to machine tools, and more particularly to a workpiece positioning mechanism which is particularly adapted to move a workpiece in two axes to various positions so as to be operated on by a punching machine, the punching machine and the positioning mechanism being under the control of a numerical control device.

Although the principles of the present invention may be included in various machine tools, a particularly useful application is made in a punching machine constructed to work on sheet stock. Various punching machines have been provided heretofore wherein the workpiece is positioned in various places manually, either without guidance, guided by gaging, or guided by a template follower system. In a more sophisticated type of machine tool, the workpiece is moved about by a workpiece positioning mechanism under the control of a tape controlled system.

In previous machines of this type, the positioning mechanism has been relatively heavy and large, and by its nature, the positoning mechanism must extend through the throat of the press. Therefore, it has been necessary heretofore to provide a relatively large throat in the press, thereby making the press relatively massive, even though the press had a relatively small effective throat size.

In accordance with the present invention, there is provided a workpiece positioning mechanism wherein that portion of the mechanism which extends through the throat of the press is relatively short in the direction in which the throat opens, namely in the direction of the length of the throat. The necessary drive mechanisms for this element are located outside of the throat, and yet the movable mass is made relatively low, thereby resulting in the provision of a machine tool of relatively small size for its effective throat size, and which is particularly constructed to be controlled by numerical control devices.

Accordingly, it is an object of the present invention to provide an improved workpiece positioning mechanism for a machine tool, which mechanism is particularly advantageous for use with a numerical control device.

A further object of the present invention is to provide a workpiece positioning mechanism wherein very little of the effective throat size of the machine is occupied by such positioning mechanism.

A still further object of the present invention is to provide a workpiece positioning mechanism so constructed as to have a relatively low mass which is to be moved.

Many other features, advantages, and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 1 is a side elevational view of a numerically controllable punching machine having a workpiece positioning mechanism provided in accordance with the principles of the present invention, portions of the machine being broken away;

FIG. 2 is a schematic view showing the general organization of the positioning mechanism, the elements thereof appearing in perspective;

FIG. 3 is a top view of the positioning mechanism, shown partly in cross-section, and taken along line III—III of FIG. 1;

FIG. 4 is an enlarged cross-sectional view of a fragmentary portion of the positioning mechanism, taken along line IV—IV of FIG. 3;

FIG. 5 is an enlarged cross-sectional view thereof, taken along line V—V of FIG. 3;

FIG. 6 is an enlarged cross-sectional view, taken along line VI—VI of FIG. 3; and FIG. 7 is a cross-sectional view of a workpiece clamp carried by the positioning mechanism.

As shown on the drawings:

The principles of this invention are particularly useful when embodied in a machine tool such as a punching machine, illustrated and generally indicated in FIG. 1 by the numeral 10. The machine tool 10 includes a generally C-shaped frame 11 having a lower arm 12 and an upper arm 13 vertically spaced therefrom so as to define a C-shaped configuration. The frame 11 has a laterally opening throat 14, the open end of which constitutes the front of the machine, and the throat being open at its sides. The frame 11 further includes a vertical portion 15 which joins together and spaced upper and lower arms 13, 12, and a workpiece-supporting table 16 is disposed within the throat 14, and extends laterally therefrom, both in a forward direction, to the left, and to the right. A portion of the table 16 extends on opposite sides of the vertical portion 15 of the frame 11. The lower arm 12 supports a die 17 and the upper portion or upper arm 13 supports a reciprocable punch for cooperation with the die 17, the punch being carried within a punch holder 18, and vertically reciprocated by a connecting rod 19 carried on an eccentric 20. A motor 21 through a pair of belts 22 drives a pulley 23 connected to the eccentric 20. From time to time, as may be desired, the punch (not shown) and the die 17 are changed in accordance with the work requirements.

A workpiece 24 is normally disposed within the throat 14 between the punch and die means, and is held by a workpiece clamp 25, shown in greater detail in FIG. 7. The workpiece clamp 25 is secured to a workpiece positioning mechanism generally indicated at 26, the same being more fully illustrated in FIG. 3.

As seen in FIG. 3, the workpiece positioning mechanism 26 includes an open-rectangular rigid frame generally indicated at 27, a supporting means 28 so supporting the frame 27 as to enable movement of the frame in one direction, and a supporting means 29 so supporting the frame 27 as to enable movement thereof at right angles to the first mentioned direction. A first motor 30 (FIGS. 2 and 5) is drivingly connected to the supporting means 28, and a second motor 31 (FIGS. 2 and 6) is drivingly connected to the supporting means 29.

A first rail or rail means 32, having portions 32a and 32b, is fixedly secured to the table 16, and supports the supporting means 28 thereon for movement therealong. A second rail or rail means 33 supports the supporting means 29 for movement thereon and therealong.

The motor 30 acts through a lead-screw 34 which has a driving connection with the supporting means 28 to move the frame 27 in a direction parallel to the axis of the rail 32. The motor 31 acts through a further lead-screw 35 which has a driving connection with the supporting means 29 to move the frame 27 in a direction parallel to the axis of the rail 33. A signal generator 36 is connected to the lead-screw 34, and a signal generator 37 is connected to the lead-screw 35.

The open-rectangular rigid frame 27 has a front side 38, a left side 39, a right side 40, and a rear side 41. The front side 38 extends through the throat 14, and the workpiece 24 is secured to the front side 38 by the clamps 25. When the frame 27 is moved by the motor 31 in a direction parallel to the rail 33, the supporting means 28 so supports the left and right sides 39 and 40 of the frame 27 as to enable such movement parallel to such sides. When the motor 30 moves the frame 27, the supporting means 29 enables movement of the side 41 of the frame 27 therethrough, such movement being parallel to the rail 32. The motors 30, 31 are reversible so that each can reciprocate the frame 27, the motor 30 being operative to reciprocate the frame 27 in a direction herein referred to as the X-axis, and the motor 31 being operative to reciprocate the frame 27 in a direction herein referred to as the Y-axis. Thus, the motor 30 is connected to the side 40 and drives it in a direction perpendicular to the length of the side 40, while the motor 31 is connected to the side 41 and drives it in a direction perpendicular to the length of the side 41.

The construction of the supporting means 28 is such that the frame 27 cannot pivot about the axis of the rail 33. Similarly, the supporting means 29 prevents pivoting of the frame 27 about the axis of the rail 32.

The lead-screw 34 and the lead-screw 35 are each rotatably supported by the machine tool in a stationary position in a manner enabling such lead-screws 34, 35 to be rotated by the motors 30, 31. Such stationary position precludes axial as well as lateral movement of both lead screws, whereby their masses form no part of the mass to be laterally displaced.

The signal generators 36, 37 are of a known type, and each is operative in response to rotation of the associated lead-screw to provide signals which indicate the rotation thereof, and thus indicate to the numerical control device (not shown) the position of the frame 27 in the X-axis and in the Y-axis.

The supporting means 28 includes a pair of spaced side blocks 42, 43 which are movably or slidably carried on the rail 32b, 32a, and a tie rod 44 clamped at its ends to the slide blocks 42, 43 so as to define a generally H-shaped structure As best seen in FIG. 3, since the frame 27 encircles the vertical portion 15 of the machine tool frame 11, the rail 33 is secured to the rear side of the frame 11 and projects rearwardly therefrom in a direction opposite to that in which the arms 12 and 13 extend.

As best seen in FIG. 3, the rear side 41 of the frame 27 comprises a tubular member which is clamped at its ends to a pair of rigid brackets 45, 46, which brackets are also clamped to the rear ends of elongated members 47, 48 of circular cross-section. The forward ends of the circular cross-section members 47, 48 are clamped in bracket portions 49, 50, each integral with the front side 38 of the rigid frame 27. Throughout substantially the entire length of the side members 47, 48, there is provided a pair of stiffening members 51, 52 of T-shaped cross-section. The upper sides of the slide block members 42, 43 are slotted to enable the passage of the T-shaped stiffening member therethrough and therealong. This construction is illustrated in elevation in FIG. 1, and in cross-section in FIGS. 4 and 5.

Near the left end of the lead-screw 34, as shown in FIG. 3, there is provided a bearing clamp 54, and an adjustable friction block 55 by which a selected amount of drag may be applied to the lead-screw 34 so as to minimize functional overshoot. A drag member similar to the drag member 55 is also provided at the inner end of the lead-screw 35, as shown at 56 in FIG. 1.

The rail 32 is supported in slightly spaced relation to the upper surface of the table 16, as shown in FIG. 4. An elongated spacer 58 underlies each of the rail sections 32a, 32b, and is bolted to the rail sections 32a, 32b. The spacer 58 is disposed in a groove 59 which opens upwardly through the upper surface of the table 16, and the forward edge 60 of the groove 59 is carefully machined so that it defines a reference surface which is absolutely straight. A number of clamping blocks 61 are secured in wedging relation in the groove 59, and force the spacer 58 against the surface 60 with sufficient force so as to remove any non-linearity from the rails 32a, 32b. A number of such clamping blocks 61 are illustrated in FIG. 3.

It is preferable that friction between relatively moving load carrying or force transmitting parts be held to a minimum, and therefore, suitable ball bearings are used throughout the device to minimize friction. The side 39 is supported in the slide block 42 by a pair of bearings, and similarly, the side 40 is supported in the slide block 43 by a pair of bearings, the latter being diagrammatically illustrated in FIG. 4 at 62 and 63. The supporting means 29 is supported by a pair of bearings 64, 65, and contains a further pair of such bearings 66, 67, located as shown in FIG. 3, for supporting the side 41 of the frame 27. The lead-screw 34 is supported at its driven end by a bearing 68, and at its opposite end by a bearing 69, similar bearing assemblies being provided for the lead-screw 35, as shown in FIG. 6. The connection between the lead-screw 34 and the slide block 43 is provided by a ball drive 70 of a known type, such a structure also being employed between the lead-screw 35 and the supporting means 29.

A bracket 71 is secured to a rear surface on the slide block 43, and rotatably supports a roller 72 which bears against the upper surface of the table 16 along the rear marginal edge thereof. Such a roller 72 is preferably provided on both of the slide blocks 42 and 43, and these rollers 72 serve to lessen the load supported by the rail 33 and to minimize any tendency to rock about the axis of the rail 32.

The bracket 71 at its lower end also carries an actuator 73 which is engageable with one of a number of limit switches 74 which form or comprise interlock elements in the control circuit. Similar switches 75 shown in FIG. 3 provide a similar function in the Y-axis and are actuated by a portion of the supporting means 29.

Referring to FIGS. 5 and 6, each of the motors 30 and 31 has a pulley 76 which drives a belt 77 extending about a pulley 78 corotatably carried on the associated lead-screw 34–35. An end of each of the lead-screws 34 and 35 is connected through a coupling assembly 79 to the signal generators 36 and 37 respectively. The signal generators 36 and 37 are of a known type, and along with the limit switches 74, 75, the motors 30, 31, and control means for the punch ram, are connected to a suitable numerical control tape-operated device. An example of such a device is one manufactured and sold by Hughes Aircraft Co., their Production Systems Control NC–211.

The motor 30 is secured to a housing 80 secured to the machine tool, the housing 80 supporting the signal generator 36. The motor 31 is carried by a rearwardly projecting bracket 81 which is secured to the frames of the machine tool, such bracket 81 also supporting the bearings 68 and 69 of the Y-axis and the signal generator 37, together with the outboard end of the rail 33.

The clamp or clamp assembly 25 is illustrated more fully in FIG. 7 and includes a body 82 having at its rear side a recess 83 within which or through which the front side 38 of the frame 27 extends. The body 82 has an insert 84 which is smooth and hardened and engages the lower surface of the front side 38 and is drawn up against it by a number of clamping screws 85, one of which is illustrated. Each of the inner ends of the screws 85 engages a plug 86 which is received within a forwardly and upwardly extending slot 87 in the front side 38. Thus, the clamp 25 may be moved horizontally to a selected position, and the screws 85 tightened to secure the same at such point.

The body 82 is horizontally and centrally slotted near the lower portion thereof to provide a pair of spaced shoulders or bifurcations, one of which is shown at 88, and between which a clamping finger 89 is pivoted as at 90a.

The forward end of the clamping lever 89 has an adjustment screw 90 which regulates the size of the opening defined between it and a coacting jaw 91 which forms a part of the body 82. The rear end of the lever 89 rests on the head 92 of a bolt 93 which has suitable nut means 94 at its upper end, a spring 95 being interposed between the body 82 and the inner end of the lever 89. The nut means 94 has a rearwardly extending circular projection 96 which is received within an opening in a cam 97, to which cam a handle 98 is secured. When the handle 98 is rotated, the cam 97 is turned so that the nut means 94 may move downwardly toward the body 82 in response to action of the spring 95, thereby tilting the clamping lever 89 to a workpiece-releasing or open position. When the handle 98 is rotated to raise the bolt 93, a clamping force is transmitted from the cam 97 to the nut means 94, and by it through the bolt 93 to its head 92 which elevates the rearward end of the lever 89 to force the screw 90 toward the jaws 91 so as to clamp a workpiece therebetween.

In operation, a manually controlled input or a tape controlled input establishes a predetermined amount of movement which should be imparted to the workpiece in a particular axis. In response to this condition, the control device (not shown) delivers power to the motor 30 or 31 so as to shift the workpiece in that axis by rotating the appropriate lead-screw 34 or 35. The lead-screw rotation also operates the corresponding signal generator 36 or 37 which indicates to the control mechanism the amount of movement that has been completed, such as by cancelling progressively the initial input signal until zero is reached, at which time the workpiece has been moved the prescribed predetermined amount. Thus, each movement utilizes the last stationary position as a reference from which the next prescribed movement is made.

From the foregoing, it is evident that a very small part of the throat 14 is occupied by the front side 38 of the rigid open-rectangular frame 27, and that the mass to be moved in each axis is kept at a minimum by the disclosed and claimed structure.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A workpiece positioning mechanism in a machine tool having spaced upper and lower arms joined together by a vertical portion so as to define a C-shaped configuration having a laterally opening throat from which a table extends horizontally, comprising in combination therewith:
   (a) an open-rectangular rigid frame encircling said vertical portion, and having a side disposed in said throat, to which side the workpiece is to be secured;
   (b) a first rail supported fixedly on said table;
   (c) a second rail fixedly secured to said machine tool and extending perpendicularly to said first rail and in a direction parallel to that in which said arms extend;
   (d) first and second means respectively movably supported on said first and second rails, and so supporting said frame as to enable movements of said frame in directions parallel to said rails;
   (e) roller means carried by said first supporting means and engageable with said table and limiting rocking of said first supporting means about the axis of said first rail;
   (f) a first motor drivingly connected to said first supporting means, and operative thereon to reciprocably move said frame with respect to said second supporting means; and
   (g) a second motor drivingly connected to said second supporting means, and operative thereon to reciprocably move said frame with respect to said first supporting means.

2. A workpiece positioning mechanism in a machine tool having spaced upper and lower arms joined together by a vertical portion so as to define a C-shaped configuration having a laterally opening throat from which a table extends horizontally, comprising in combination therewith:
   (a) an open-rectangular rigid frame encircling said vertical portion, and having a side disposed in said throat, to which side the workpiece is to be secured;
   (b) means defining an upwardly opening slot in said table, one side of said slot being of precisely straight configuration;
   (c) an elongated first rail;
   (d) an elongated spacer rigidly secured to said first rail and projecting into said slot in said table;
   (e) clamping means in said slot forcing said spacer against said straight side of said slot to hold said rail in a straight position;
   (f) a second rail fixedly secured to said machine tool and extending perpendicularly to said first rail;
   (g) first and second means respectively movably supported on said rails, and so supporting said frame as to enable movements of said frame in directions parallel to said rails;
   (h) a first motor drivingly connected to said first supporting means, and operative thereon to reciprocably move said frame with respect to said second supporting means; and
   (i) a second motor drivingly connected to said second supporting means, and operative whereon to reciprocably move said frame with respect to said first supporting means.

3. A workpiece positioning mechanism in a machine tool, comprising in combination:
   (a) a stationary frame;
   (b) a movable open-rectangular rigid frame comprising four rectangularly arranged spaced sides defining a central opening, said open-rectangular frame being supported for movements in directions parallel to each of its sides, and to which frame the workpiece is to be secured adjacent to said opening at the outside of said movable frame;
   (c) a first stationary motor drivingly connected to one side of said movable frame and supported by said stationary frame, and operative to reciprocably move said frame in a first direction which is perpendicular to a first side; and
   (d) a second stationary motor drivingly connected to a further side of said movable frame immediately adjacent to said one side and supported by said stationary frame, and operative to reciprocably move said movable frame in a direction which is perpendicular to said first direction and parallel to said first side.

4. A workpiece positioning mechanism in a machine tool, comprising in combination:
   (a) a stationary frame;
   (b) a movable open-rectangular rigid frame comprising four rectangularly arranged spaced sides defining a central opening, said open-rectangular frame being supported for movements in directions parallel to each of its sides, and to which frame the workpiece is to be secured adjacent to said opening at the outside of said movable frame;
   (c) a first stationary motor drivingly connected to a first side of said movable frame and supported by said stationary frame, and operative to reciprocably move said frame in a first direction which is perpendicular to a first side; and
   (d) a second stationary motor drivingly connected to a second side of said movable frame immediately adjacent to said first side and supported by said stationary frame; and operative to reciprocably move said movable frame in a second direction which is perpendicular both to said first direction and to said second side.

5. A workpiece positioning mechanism in a machine tool, comprising in combination:
   (a) a open-rectangular rigid frame comprising four rectangularly arranged spaced sides defining a central opening, to which frame the workpiece is to be secured adjacent to said opening at the outside of said frame;
   (b) first and second means respectively supporting adjacent sides of said frame and enabling movement of said frame in directions parallel to each of said sides;
   (c) a first stationary motor drivingly connected to said first supporting means, and operative on said first supporting means to reciprocably move said frame with respect to said second supporting means; and
   (d) a second stationary motor drivingly connected to said second supporting means, and operative on said second supporting means to reciprocably move said frame with respect to said first supporting means.

6. A workpiece positioning mechanism in a machine tool, comprising in combination therewith:
   (a) an open-rectangular rigid frame comprising four rectangularly arranged spaced sides defining a central opening, to which frame the workpiece is to be secured adjacent to said opening at the outside of said frame;
   (b) first and second rails extending in directions perpendicular to each other, and respectively supported in fixed positions on the machine tool;
   (c) first and second means respectively movably supported on said rails, and respectively supporting adjacent sides of said frame and enabling movements of said frame in directions parallel to said rails;
   (d) a first stationary motor drivingly connected to said first supporting means, and operative on said first supporting means to reciprocably move said frame with respect to said second supporting means; and
   (e) a second stationary motor drivingly connected to said second supporting means, and operative on said second supporting means to reciprocably move said frame with respect to said first supporting means.

7. A workpiece positioning mechanism in a machine tool, comprising in combination therewith:
   (a) an open-rectangular rigid frame comprising four rectangularly arranged spaced sides defining a central opening, to which frame the workpiece is to be secured adjacent to said opening at the outside of said frame;
   (b) first and second rails extending in directions perpendicular to each other, and respectively supported in fixed positions on the machine tool;
   (c) first and second means respectively movably supported on said rails, and respectively supporting adjacent sides of said frame and enabling movements of said frame in directions parallel to said rails, at least one of said supporting means being operative through said frame to preclude any tendency of the other of said supporting means to rotate about an axis parallel to that one of said rails on which said other supporting means is supported;
   (d) a first stationary motor drivingly connected to said first supporting means, and operative on said first supporting means to reciprocably move said frame with respect to said second supporting means; and
   (e) a second stationary motor drivingly connected to said second supporting means, and operative on said second supporting means to reciprocably move said frame with respect to said first supporting means.

8. A workpiece positioning mechanism in a machine tool, comprising in combination:
   (a) an open-rectangular rigid frame comprising four rectangularly arranged spaced sides defining a central opening, to which frame the workpiece is to be secured adjacent to said opening at the outside of said frame;
   (b) first and second means respectively supporting adjacent sides of said frame and enabling movements of said frame in directions parallel to each of said sides;
   (c) a first lead-screw supported for rotation in a fixed position and drivingly connected to said first supporting means in a manner to reciprocably move said frame with respect to said second supporting means;
   (d) a second lead-screw supported for rotation in a fixed position and drivingly connected to said second supporting means in a manner to reciprocably move said frame with respect to said first supporting means; and
   (e) a pair of stationary motors respectively drivingly connected to said lead-screws.

9. A workpiece positioning mechanism in a machine tool, having spaced upper and lower stationary arms joined together by a stationary vertical portion so as to define a C-shaped configuration having a laterally opening throat, comprising in combination therewith:
   (a) an open-rectangular rigid frame comprising four rectangularly arranged spaced sides defining a central opening, said open-rectangular frame encircling said vertical portion of said C-shaped configuration, and having one of said sides disposed in said throat tween said arms, to which one side the workpiece is to be secured adjacent to said opening at the outside of said frame;
   (b) first and second means respectively supporting other adjacent sides of said frame and enabling movements of said frame in directions parallel to each of said sides;
   (c) a first stationary motor drivingly connected to said first supporting means, and operative on said first supporting means to reciprocably move said frame with respect to said second supporting means; and
   (d) a second stationary motor drivingly connected to said second supporting means, and operative on said second supporting means to reciprocably move said frame with respect to said first supporting means.

10. A workpiece positioning mechanism in a machine tool having spaced upper and lower stationary arms joined together by a vertical portion so as to define a C-shaped configuration having a laterally opening throat, comprising in combination therewith:
   (a) an open-rectangular rigid frame comprising four rectangularly arranged spaced sides defining a central opening, said open-rectangular frame encircling said vertical portion of said C-shaped configuration, and having one of said sides disposed in said throat between said arms, to which one side the workpiece is to be secured adjacent to said opening at the outside of said frame;
   (b) a first rail supported in a fixed position on said machine tool;
   (c) a sceond rail secured in a fixed position on said vertical portion of said C-shaped configuration and extending perpendicularly to said first rail and in a direction opposite to that in which said spaced arms of said C-shaped configuration extend;
   (d) first and second means respectively movably supported on said rails, and respectively supporting adjacent sides of said frame and enabling movements of said frame in directions parallel to said rails;
   (e) a first stationary motor drivingly connected to said first supporting means, and operative on said first supporting means to reciprocably move said frame with respect to said second supporting means; and
   (f) a second stationary motor drivingly connected to said second supporting means, and operative on said second supporting means to reciprocably move said frame with respect to said first supporting means.

11. A workpiece positioning mechanism in a machine tool, comprising in combination:
 (a) an open-rectangular rigid frame comprising four rectangularly arranged spaced sides defining a central opening, at least one of said sides of said frame comprising a pair of parallel members, one of said members being an elongated member of circular cross-section, and the other being an elongated member of T-shaped cross-section rigidly secured to said one member;
 (b) first and second means respectively supporting adjacent sides of said frame and enabling movements of said frame in directions parallel to each of said sides, said one of said means which supports said one side being movably engageable with the circular portion thereof, and having a slot through which said T-shaped member projects and in which slot said T-shaped member can move;
 (c) a first stationary motor drivingly connected to said first supporting means, and operative on said first supporting means to reciprocably move said frame with respect to said second supporting means; and
 (d) a second stationary motor drivingly connected to said second supporting means, and operative on said second supporting means to reciprocably move said frame with respect to said first supporting means.

References Cited by the Examiner

UNITED STATES PATENTS

| 836,423 | 11/1906 | Wilzin | 214—1.3 |
| 1,570,928 | 1/1926 | Thomas | 214—1.3 X |
| 2,679,620 | 5/1954 | Berry. | |
| 3,171,207 | 3/1965 | Wormser | 33—23 |

FOREIGN PATENTS 1,148,908　7/1957　France.

MARVIN A. CHAMPION, *Primary Examiner.*